| United States Patent [19] | [11] | 4,370,088 |
|---|---|---|
| McShane | [45] | Jan. 25, 1983 |

[54] PORTABLE FENCING LOADING MEANS

[76] Inventor: Peter F. McShane, "Woodspring" Bothwell, Tasmania, 7411, Australia

[21] Appl. No.: 203,214

[22] Filed: Nov. 3, 1980

[51] Int. Cl.$^3$ ............................ B60P 1/52; B60P 3/00
[52] U.S. Cl. ................................... 414/439; 256/26; 410/2; 410/32; 414/491; 414/529; 414/536
[58] Field of Search ............... 414/439, 440, 434, 483, 414/491, 529, 536; 256/1, 24, 26; 280/473; 410/2, 31, 32

[56] References Cited

U.S. PATENT DOCUMENTS

| 2,156,438 | 5/1939 | Suverkrup | 414/491 |
| 2,518,293 | 8/1950 | Anguera | 414/439 |
| 2,848,126 | 8/1958 | Taylor | 414/483 |
| 3,667,779 | 6/1972 | Miskin | 280/473 |
| 3,741,529 | 6/1973 | Blagg | 256/26 |

FOREIGN PATENT DOCUMENTS

| 32271 | 7/1969 | Australia . |
| 97502 | 9/1948 | New Zealand . |
| 130140 | 8/1963 | New Zealand . |
| 150512 | 6/1970 | New Zealand . |
| 163439 | 10/1972 | New Zealand . |
| 172461 | 7/1975 | New Zealand . |

*Primary Examiner*—Robert G. Sheridan
*Attorney, Agent, or Firm*—Biebel, French & Nauman

[57] ABSTRACT

A trailer for loading and unloading fences and includes two rollers at the rear of the trailer for assisting passage of fence sections onto the trailer. The rollers are drawn via a pulley which is movable into and out of contact with a wheel of the trailer. A sprocket is connected to the pulley and one roller and an endless chain engaged the sprocket to drive the rollers. The trailer may be tilted relative to its drawbar to assist in loading and unloading the fences.

8 Claims, 15 Drawing Figures

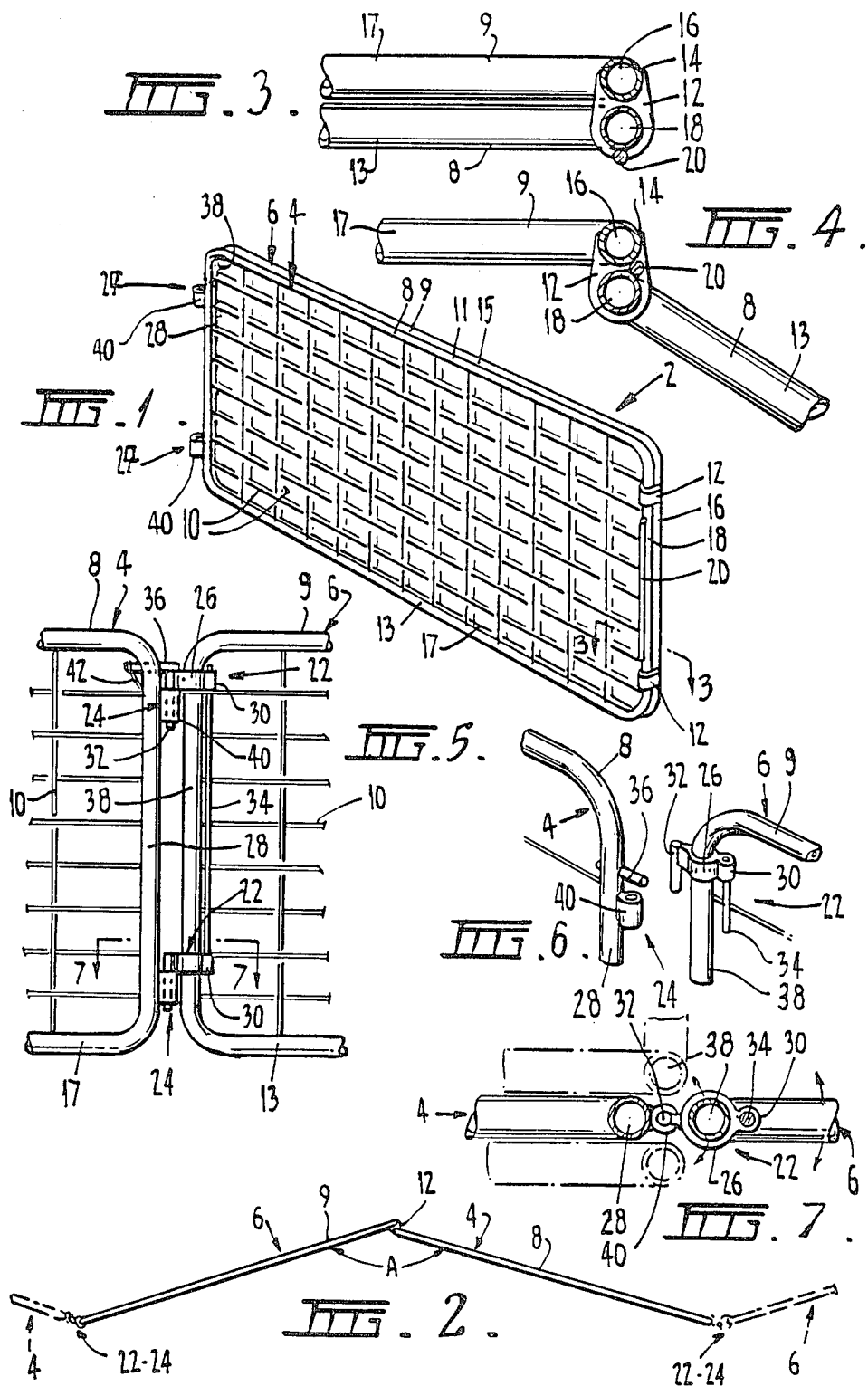

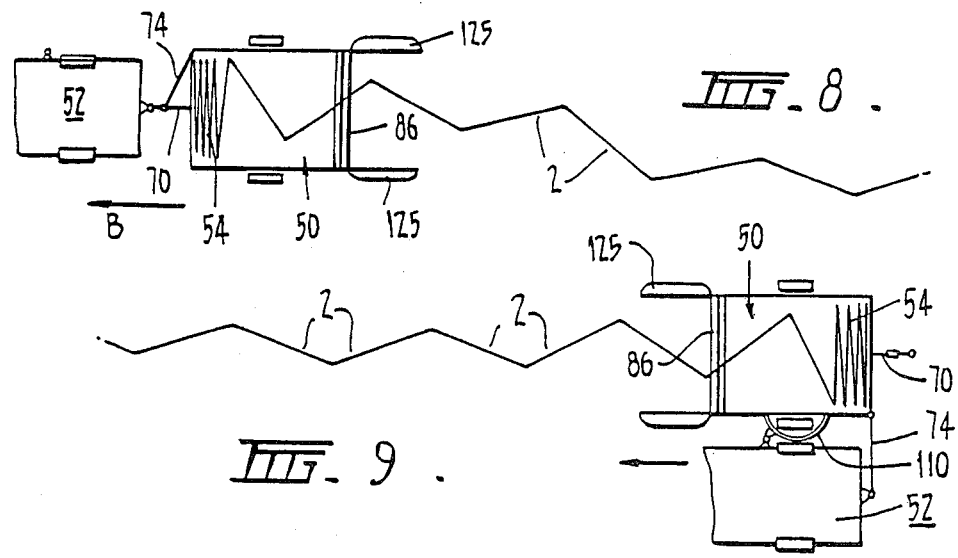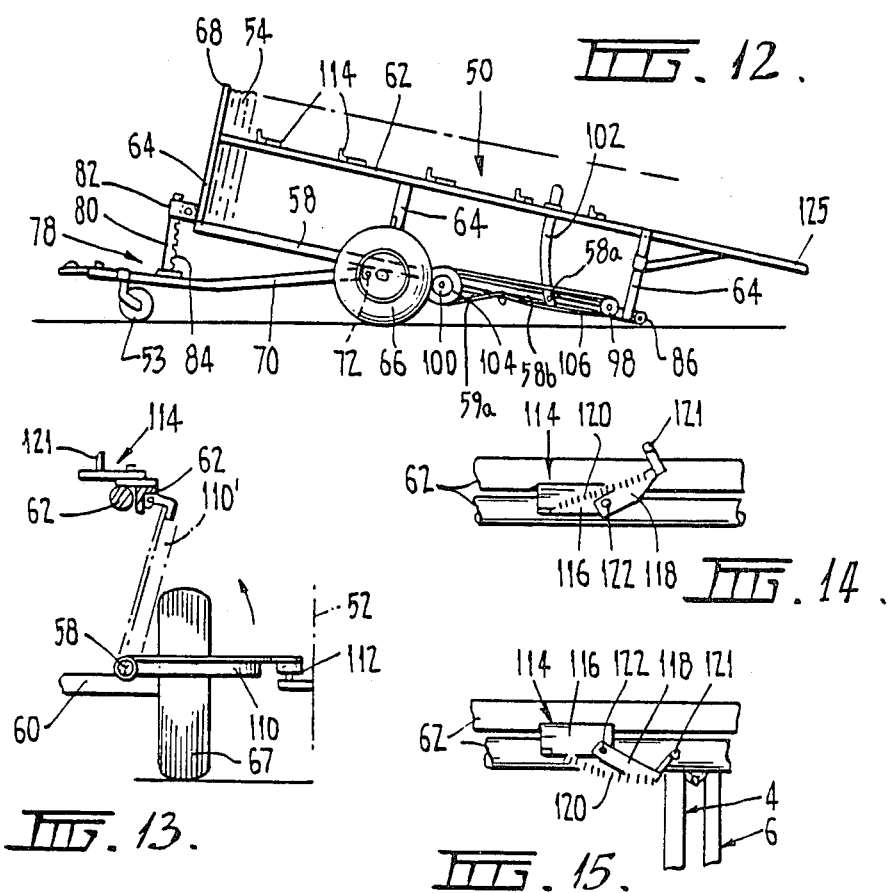

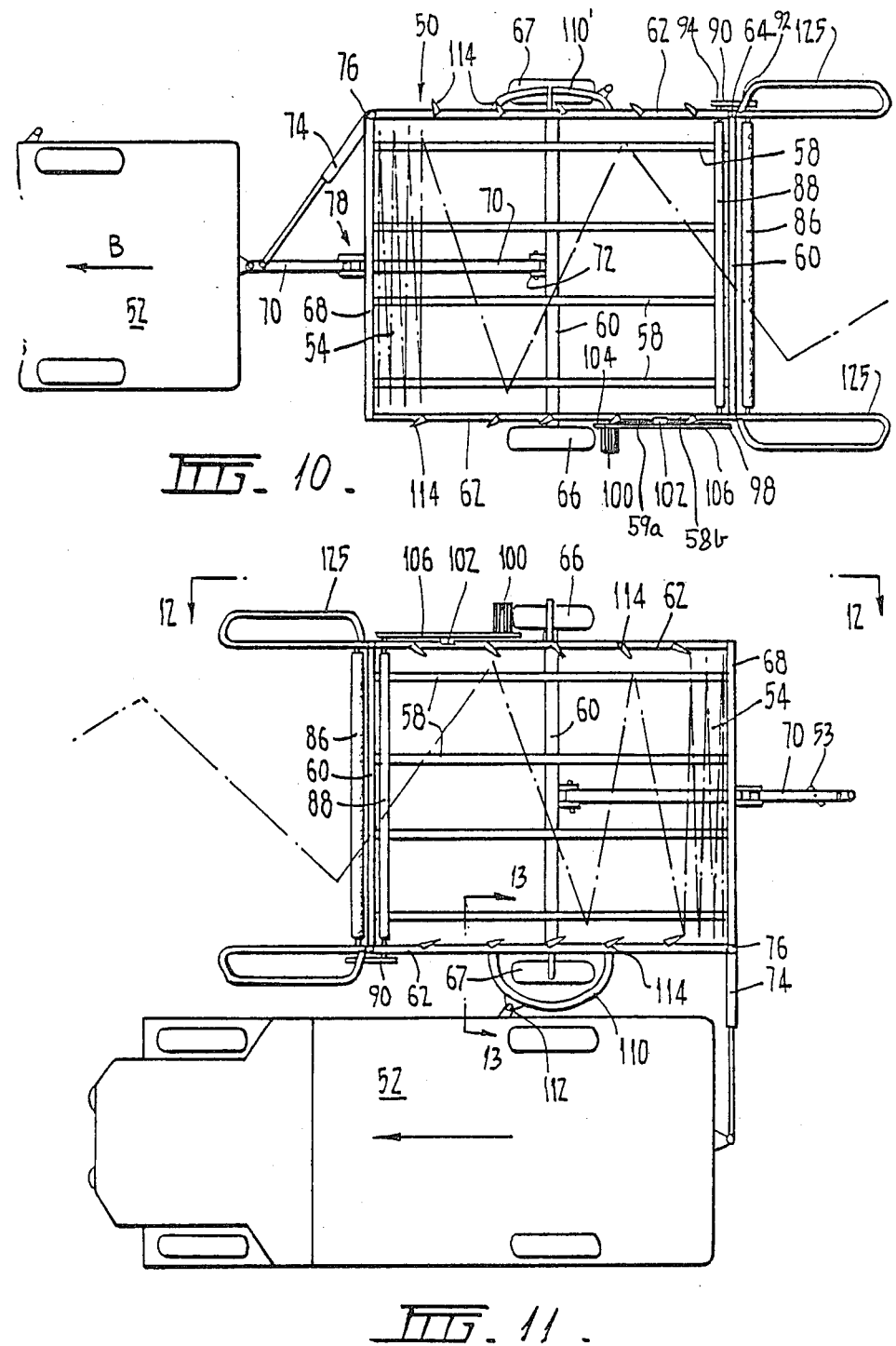

PORTABLE FENCING LOADING MEANS

This invention relates to a trailer for loading and unloading portable fencing units which may be used to form yards for containing animals such as sheep.

Previously, numerous types of portable fencing have been proposed for forming sheep yards. One type comprises a plurality of light and flexible fence sections which are held rigid and upright by steel posts. Although the light and flexible fence sections are readily moved to and from the location of the sheep yard, once the yard has been erected the design of the yard can only be altered by first extracting the posts and moving the gates to their new position. Further, the task of erecting the yard and disassembling the same is extremely time consuming.

A second type of fencing hitherto employed comprises heavy rigid fence sections which require considerably time and labor to load and unload from trucks for transportation to and from the site of the yard.

There has therefore been the need for a trailer which will allow a portable fencing arrangement to be economically transported and erected. Preferably, the trailer of this invention is to be used with the portable fencing described in my copending U.S. applicaton Ser. No. 000,645, filed Jan. 2, 1979.

The present invention provides a trailer for loading and unloading a portable fence, which has sections which fold together, said trailer having a base for supporting the fence a roller means adjacent said base at the rear of the trailer and means for driving said roller means at least when the fence is to be loaded, said roller means extending across the base of the trailer, at least substantially the length of the sections of the fence, to thereby assist passage of the fence onto the trailer during loading.

Preferably, two rollers are embodied in the invention, the rear rollers having a rubber covering and the other having no covering. Two rollers are embodied to carry the fence sections past the spaces between the sections and the rubber covering allows the rear roller to provide a surface on which the sections may find traction and the other roller allows the fence sections to turn to facilitate folding.

The preferred embodiment of the invention shall be described with reference to the accompanying drawings in which:

FIG. 1 shows a fence unit in the fully folded position which may be used with the trailer embodying this invention, FIG. 2 shows a plan view of the fence unit in the fully open position, FIG. 3 shows a view along the line 3—3 of of FIG. 1 of the connecting means and stop means of the fence unit, FIG. 4 shows the connecting means and stop means of FIG. 3 with the fence sections in the fully open position, FIGS. 5 and 6 show the manner in which the fence units are releasably connected together so that fence units may be joined to form a fenced yard, FIG. 7 shows a view along the line 7—7 of FIG. 5, FIG. 8 shows a schematic diagram of the manner in which the fence is unloaded from the trailer, FIG. 9 shows a schematic diagram and the manner in which the fence is loaded onto a trailer, FIG. 10 shows a plan view of the trailer, in the unload position, FIG. 11 shows a plan view of the trailer in the load position, FIG. 12 is a side elevation of the trailer along the line 12—12 of FIG. 11, FIG. 13 is a view of the second connection means of the trailer taken along the line 13—13 at FIG. 11.

FIG. 14 shows a plan view of a member for holding the fence on the trailer, said member being in the open position.

FIG. 15 has a plan view similar to FIG. 14 but with the member for holding the fence on the trailer in the closed or holding position.

Referring to FIG. 1, a fence unit 2 is shown in the fully closed or folded position and comprises two fence sections 4 and 6. The fence sections 4 and 6 each comprise a substantially rectangular frame 8 and 9 respectively formed of tubular pipes each of which holds a panel of wire mesh 10. The frame 8 comprises an inner upright portion 18, a remote upright portion 28 and upper and lower horizontal portions 11 and 13. The frame 9 comprises an inner upright portion 16, a remote upright portion 38 and upper and lower horizontal portions 15 and 17. The fence sections 4 and 6 are generally planar and are connected at one end by two hinges 12. The hinges 12 are substantially u-shaped members which are welded at their open end 14 onto the upright portion 16 of the frame 9 of fence section 6 and enclose upright portion 18 of the frame 8 the other fence section 4. A sleeve (not shown) may be provided within the hinge 12 which encloses the upright portion 18 between the hinge so that the two fence sections 4 and 6 are snugly held by the hinge 12 in a manner which allows the upright 18 to rotate within the hinge so that the fence sections 4 and 6 may swing relative to each other.

A stop member in the form of a rod 20 is connected by welding to the upright 18 of frame 8 of the fence section 4 between the hinges 12.

The rod 20 is preferably welded onto a portion of upright 18 at a location which will allow the upright to rotate through about 160° before abutting the upright 16 of fence section 6 and thereby prevent further opening of the fence sections 4 and 6.

The fence sections 4 and 6 may therefore swing relative to each other from the fully closed position (FIG. 1) to a fully open position (FIG. 2) where the rod 20 abuts the upright 16 of the fence section 6.

As best seen in FIG. 2 when the fence sections 4 and 6 are in the fully open position they form a v-shape which opens to an angle A of 160°. When in an open position the fence unit 2 comprising the fence sections 4 and 6 is fully self supporting.

The fence unit 2 also has cooperating hinge components 22 and 24 (as best shown in FIGS. 5 to 7) at the ends of the fence sections 6 and 4 on remote upright portion 38 and remote upright portion 28 respectively. The hinge components 22 and 24 are provided so that a plurality of fence units may be releasably connected to form a portable fence. Fence units may therefore be conveniently added or removed from an existing portable fence to alter the size thereof.

Hinge component 22 which is provided on fence section 6 comprises a pair of annular members 26 vertically spaced apart on the upright 38 of frame 9 of fence section 6. The annular members 26 encircle upright 38 for relative rotation with upright 38. The sleeves 26 have an eyelet 30 at one side thereof and a connecting pin 32 which is secured to and projects downwardly from the opposite side thereof.

The pair of hinge components 22 are spaced vertically apart on upright 38 by a torsion bar 34. The torsion bar 34 prevents the top hinge from twisting relative to the bottom hinge and also allows for controlled flexibility on rough ground while at the same time assisting in keeping the fence upright and rigid.

Cooperating hinge components 24 are provided on upright 28 of frame 8 of fence section 4. The hinge components 24 comprises a pair of second sleeves 40 which are secured at vertically spaced locations to the upright 28. A securing pin 36 is provided slightly above the top hinge component 24 and extends through a bore (not shown) in the upright 28. The securing pin 36 is biased through the bore by a leaf spring or spring wire 42 (FIG. 5).

In order to connect two fence units 2 together the ends of the two fence units 2 having the cooperating hinge components 22 and 24 are arranged adjacent to one another and the securing pin 36 is forced away from the top hinge component against the bias of spring 42 so that the connecting pins 32 may be placed within the second sleeves 40 whereafter the spring 42 is released so that the securing pin 36 is returned to its position above the top hinge component to prevent accidental disconnection of the two fence units.

The cooperating hinge components 22 and 24 allow a complete 360° swing of the two fence units relative to each other due to relative rotation being possible about either of two axes, the first being a vertical axis through the connecting pins 32 and the second being a longitudinal axis through the upright 38.

Accordingly, a complete self supporting fence or yard may be formed by joining together a plurality of fence units 2, since the hinge 12 will allow the fence section 4 and 6 to open to a certain angle before being prevented from further swing by rod 20 and the hinge components 22 and 24 will allow a complete 360° swing so that the fence is always arranged on the ground in a zig-zag pattern as shown in FIG. 2.

Referring now to FIGS. 8 and 9, a trailer 50 which is towed by a vehicle 52 is proposed for allowing rapid erection and removal of the portable fence formed from fence units 2. A number of fence units are joined in the manner described above and are folded together by swinging the individual fence section 4 and 6 so that the fence forms a concertina type arrangement 54.

In order to unload the trailer one or two connected fence units are manually removed from the rear of the trailer 50, and placed on the ground. The trailer 50 is then towed forward by vehicle 52 (as shown in FIG. 8) so that the fence is unfolded off the rear of the trailer due to the dragging friction between the ground and the manually removed fence section and means (to be discussed hereinafter) provided on the trailer. After a few of the fence units have been dragged from the back of the trailer the weight of the fence units resting on the ground is sufficient to prevent any substantial movement of the fence units relative to the ground so that the trailer may then be driven along the course the proposed fence is to take. The fence is therefore conveniently deposited on the ground substantially in the position in which it is to be used.

In order to load the fence onto the trailer for transport, the trailer is connected to the vehicle in the manner shown in FIG. 9 (to be more fully explained hereinafter) so that the vehicle 52 faces in the direction of the fence and the rear of the trailer is open in the direction of the fence. The vehicle may then be driven adjacent to the fence so that the fence is forced to fold up into the concertina arrangement 54 within the trailer 50.

With reference to FIG. 10, the trailer comprises a rectangular frame of longitudinally running members 58 and cross-members 60. Two upper longitudinally running members 62 are joined to the outmost longitudinally running members 58 by posts 64. Wheels 66 and 67 are journalled to the ends of the central cross-member 60 for free rotation thereabout. The posts 64 at the front of the trailer 50 are higher than the remaining posts and are connected to an upper cross piece 68. An intermediate cross member (not shown) is provided between the posts 64 at the front of the trailer at the same height as the upper longitudinally running members 62.

The cross-member 68 and intermediate cross member provide a backing against which the fence folded in the concertina manner 54 may rest. The trailer 50 has a drawbar 70 which is journalled at one end of a bracket 72 on the central cross-member 60, so that the frame 56 is rotatable relative to the drawbar 70. The other end of the drawbar 70 has means for connection to a vehicle 52 and a ground engaging wheel 53. A support strut 74 is pivotally connected to a corner 76 of the trailer 50 and is releasably secured to the drawbar 70.

The drawbar 70 has a ratchet mechanism 78 thereon which comprises a rack 80 projecting upwardly from the drawbar and a collar 82 connected to the front cross member 60. The rack 80 projects through the collar 82 so that the frame of the trailer may be tilted relative to the drawbar 70 (see FIG. 12) and held in the tilted position by the collar 82 which engages the teeth 84 of the rack 80.

The rear of the trailer 50 has two rollers 86 and 88 extending across the entire width thereof. The two rollers 86 and 88 are joined by a continuous belt or chain 90 which engages sprockets 92 and 94 provided on the end of the rollers 86 and 88 respectively. The other end of the roller 88 has a sprocket 98. A pulley 100 is journalled to the same side of the trailer as sprocket 98 and is movable by lever 102 into engagement with the wheel 66 of the trailer 50. The pulley 100 has a sprocket 104 connected to the inner end thereof. A continuous chain 106 engages the sprocket 104 and sprocket 98 so that when lever 102 is actuated to move pulley 100 into engagement with the rotating wheel 66 drive is transmitted via the sprocket 104, continuous chain 106 and sprocket 98 to the roller 88 and then from the roller 88 via sprocket 94, continuous chain 90 and sprocket 92 to the other roller 86.

The lever 102 moves pulley 100 into engagement with wheel 66 via connected bar 59a. Lever 102 is pivoted at 58a to portion 58b of the outer longitudinal running member 58 (see FIG. 12). The connecting bar 59a is coupled to lever 102 below the pivot 58a and is slidable relative to portion 58b of running member 58 so that when the top of lever 102 is moved to the left in FIG. 12 the bar 59a will be moved to the right to remove the pulley from the wheel and when the top of lever 102 is moved to the left, the pulley 100 will be forced against the wheel 66 by bar 59a. Means for releasably locking the top of the lever 102 in the desired position may also be provided on upper running member 62.

Trailer 50 also has a second drawbar in the form of an arch member 110 which is pivotably connected to one of the outermost longitudinal members 58 so that the arch member enclosed the wheel 67 on the opposite side of the trailer to the wheel 66 which drives pulley 100. The arch member is pivotable from an operating position to a storage position 110' (FIG. 13) and carries a connecting member 112 for connection to the vehicle 52. Preferably, the connecting member 112 and the means for connection to a vehicle on the drawbar 70 is of the ball and socket type.

The upper longitudinal members 62 preferably have a number of pawls 114 for holding the fence sections 4 and 6 when in the folded arrangement on the trailer 50. The pawls as best shown in FIGS. 14 and 15 comprise a bracket 116 connected to upper longitudinal members 62 and an arm 118 pivotally connected at pivot 122 to the bracket 116. A handle 121 is connected to arm 118. The arm 118 is biased by a spring 120 so that it projects into the trailer 50 (as shown in FIG. 15) to hold fence sections 4 and 6 as they are successively loaded on to the trailer.

Guides 125 may be pivotally connected to posts 64 at the rear of the trailer. After the trailer has been loaded the guides may be closed to prevent the end fence section from falling off the trailer.

When the fences are to be unloaded, the handle 121 is moved into the position shown in FIG. 14 so that the spring moves to the opposite side of pivot 122 to bias the arm 118 outwardly from the trailer to allow a clear path for the fence section to be drawn off the trailer. The trailer is then tilted into the position shown in FIG. 12 with the roller 86 in close proximity to the ground and held in such a position by means of the ratchet mechanism 78. The first few fence sections are manually lifted from the trailer and placed on the ground. The vehicle 52 is then driven to tow the trailer in the direction of arrow B in FIGS. 8 and 10. As the trailer moves fence sections are continuously dragged from the rear of the trailer by frictional engagement between the fence section and the ground. It is not necessary to drive the rollers to unload the fence sections.

As the fence sections are dragged from the rear of the trailer, they form a zig-zag arrangement due to the hinges 12 (detailed with reference to FIGS. 1 to 4) which preferably constitute every second connection between fence sections 4 and 6, and prevents the fence sections from opening more than 160°.

To reload the trailer, the pawls 114 are moved back into the position shown in FIG. 15 and with the trailer in the tilted position and with the pulley 100 in engagement with the wheel 66, to drive the rollers 86 and 88 as detailed hereinbefore, the trailer is disconnected from the rear of the vehicle 52 and is placed along side the vehicle 52 with the rear of the trailer opening in the direction of the fence and the vehicle facing in the direction of the fence.

The arch member 110 is pivoted from its storage position 110' to the operating position and is connected by the connecting means 112 to the side of the vehicle 52.

The support strut 74 is disconnected from drawbar 70 and rotated about pivot connection 76 and connected to the ball provided at the rear of the vehicle.

The first fence sections may then be manually placed on the trailer and the vehicle is driven adjacent to the fence so that the fence sections are folded up on to the trailer with the assistance of rollers 86 and 88. Since the erected fence is in the zig-zag formation the individual fence sections readily fold into the concertina arrangements 54 at the rear (with the trailer oriented in the load position) on the trailer.

As the individual fence sections are folded onto the trailer they contact arm 118 of pawls 114 and push the arms 118 against the bias of the spring until the individual section has moved past the arm 118. The arm 118 is then forced back into the position shown in FIG. 15, and provides a stop for preventing the fence sections from falling off the trailer. Once all the fence sections are loaded onto the trailer the guides 125 are closed and the fence loaded upon the trailer may be transported to another site.

Modifications may be made to the embodiment described with reference to the drawings. For example, a hydraulic motor may be used to drive the rollers 86 and 88 in place of the pulley 100. The hydraulic motor may be actuated from the vehicle 52 or a small engine provided on the trailer 50.

Further, instead of providing ratchet mechanism 78 to lift the trailer, the trailer may be hydraulically raised and lowered relative to the wheels 65 and 66 by the vehicle or the abovementioned small motor.

Pawls, similar to pawls 114 may be provided on the longitudinal members 58 in such a manner that the arms 118 may be raised above and lowered below the level of the longitudinal members 58. The provision of parts on the longitudinal members is advantageous if the trailer is to be used in rough terrain since the bottom of the fence section may otherwise tend to slide down the tilted trailer whilst the fence sections are being loaded onto the trailer.

In the preferred embodiment of the invention the roller 86 has a rubber covering and the roller 88 is formed solely of metal. Two rollers are used to allow the space between fence sections to pass over the rollers without becoming jammed or caught in the fence sections to lose contact as the space passes over the rollers. As the space passes over one roller the second roller continues to move the fence onto the trailer. The rubber covered roller 86 allows the fence to obtain traction and thereby continues to move the fence forward whilst the roller 88 allows the fence sections to turn as they feed over this roller so the fence can fold into the concertina arrangement on the trailer.

The claims defining the invention are as follows:

1. A trailer for loading and unloading a portable fence which has sections which fold together, said trailer having a base for supporting the fence, two rollers adjacent said base at the rear of the trailer for assisting passage of the fence onto the trailer during loading, one of said rollers being provided with a surface which allows the fence to obtain traction so that the said one roller moves the fence onto the trailer, and the other roller being provided with a surface which allows the fence sections to turn as they move over the said other roller so that the fence can fold into a concertina arrangement, said rollers being driven by drive means at least when the fence is being loaded onto the trailer, said rollers extending across the base of the trailer at least substantially the length of the sections of the fence.

2. A trailer according to claim 1, wherein said two rollers extend across the rear of the trailer, said two rollers being joined by an endless belt or chain and said driving means comprises a pulley movable into engagement with a rotating wheel of the trailer and a sprocket connected to one of said rollers, said pulley and said sprocket being joined by an endless belt or chain, such that when said pulley is moved into engagement with the rotating wheel of the trailer drive is transmitted via the pulley, endless belt of chain and sprocket to the rollers.

3. A trailer according to claim 2, including means for tilting the trailer relative to the ground such that said two rollers are placed in close proximity to the ground when the trailer is tilted.

4. A trailer according to any one of claim 1 wherein said trailer includes a drawbar pivotally connected to said trailer for connection to a driven vehicle.

5. A trailer according to claim 4, wherein said means for tilting the trailer comprises a ratchet mechanism having a rack connected to said drawbar and a collar connected to said trailer such that when said trailer is tilted relative to the drawbar, said collar moves along said rack and engages with said rack to hold the trailer in the tilted position.

6. A trailer according to any one of claim 1 further including a second connection member at a side portion thereof for connection to a side of a vehicle having a co-operating connection member on a side portion thereof, said second connection member comprising an arch member pivotally connected to said trailer and a strut pivotally connected to a front corner of said trailer such that when said trailer is positioned alongside said vehicle with the rear portion of the trailer facing toward the front of the vehicle, said arch member is adjacent to the co-operating connection member on the side portion of the vehicle and the strut is adjacent to the rear of the vehicle.

7. A trailer for loading and unloading a portable fence, which has sections which fold together, said trailer having a base for supporting the fence, a roller means adjacent said base at the rear of the trailer and means for driving said roller means at least when the fence is to be loaded, said roller means extending across the base of the trailer, at least substantially the length of the sections of the fence, to thereby assist passage of the fence onto the trailer during loading, said trailer having releasable retaining means disposed along at least one side of the trailer, the releasable retaining means being biased into a position in which it projects into the trailer so that as the fence sections are loaded onto the trailer the sections are able to push past the retaining means to be held on the trailer by the retaining means and are held from moving off the trailer by the releasable retaining means until the retaining means is released.

8. The trailer according to claim 7, wherein the retaining means comprises a plurality of arms disposed in spaced relation along the sides of the trailer, each arm being pivoted to the trailer and having a spring to bias the arm into the position in which the arm projects into the trailer so that when a fence section contacts the arm during movement of the fence onto the trailer it deflects the arm being released from the retaining position by pivoting it about said pivot such that the arm is biased by the spring to a position in which it projects outwardly of the trailer.

* * * * *